(12) United States Patent
Diamond

(10) Patent No.: US 8,893,016 B2
(45) Date of Patent: Nov. 18, 2014

(54) USING A GRAPHICS SYSTEM TO ENABLE A MULTI-USER COMPUTER SYSTEM

(75) Inventor: Michael B. Diamond, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 548 days.

(21) Appl. No.: 11/150,620

(22) Filed: Jun. 10, 2005

(65) Prior Publication Data

US 2006/0282781 A1    Dec. 14, 2006

(51) Int. Cl.
*G06F 3/00* (2006.01)
*G06T 1/20* (2006.01)

(52) U.S. Cl.
CPC ........................... *G06T 1/20* (2013.01)
USPC ............................ 715/750; 715/733; 345/502

(58) Field of Classification Search
CPC ......... G06F 3/14; G06F 9/505; G06F 3/1438; G06F 9/5044; G06T 15/005; G06T 1/20; G09G 5/363; G09G 2360/06
USPC .................................. 715/750, 733; 345/502
See application file for complete search history.

(56) References Cited

U.S. PATENT DOCUMENTS

| 5,251,295 | A | 10/1993 | Ikenoue et al. |
|---|---|---|---|
| 5,485,559 | A | 1/1996 | Sakaibara et al. |
| 5,781,747 | A | 7/1998 | Smith et al. |
| 5,794,016 | A | 8/1998 | Kelleher |
| 5,956,046 | A | 9/1999 | Kehlet et al. |
| 6,028,586 | A | 2/2000 | Swan et al. |
| 6,044,215 | A | 3/2000 | Charles et al. |
| 6,141,021 | A | 10/2000 | Bickford et al. |
| 6,206,087 | B1 | 3/2001 | Nakase et al. |
| 6,282,596 | B1 | 8/2001 | Bealkowski et al. |
| 6,304,952 | B1 | 10/2001 | Suzuoki |
| 6,331,856 | B1 | 12/2001 | Van Hook et al. |
| 6,359,624 | B1 | 3/2002 | Kunimatsu |

(Continued)

FOREIGN PATENT DOCUMENTS

| KR | 1020050047243 | 5/2005 |
|---|---|---|
| TW | 421752 | 2/2001 |

(Continued)

OTHER PUBLICATIONS

Luke E J et al Institute of Electrical and Electronics Engineers: "Semotus Visum: a flexible remote visualitzation framework" VIS 2002. IEEE Visualization 2002. Proceedings. Boston, MA, Oct. 27-Nov. 1, 2002, Annual IEEE conference on visualization, New York, NY: IEEE, US, Oct. 27, 2010, pp. 61-68, XP010633279.*

(Continued)

*Primary Examiner* — Amy Ng
*Assistant Examiner* — Andres E Gutierrez

(57) ABSTRACT

A graphics system and a multi-user computer system are disclosed. The graphics system comprises a graphics processing unit (GPU) for processing pixels. It further includes a multi-user manager for allocating pixel processing capability for each one of a plurality of users, wherein each user uses a display and an input device. Moreover, the graphics system has a plurality of user attributes for each user. The multi-user computer system comprises a central processing unit (CPU) and a disk drive configured to support a plurality of users. Further, the multi-user computer system includes the graphics system.

18 Claims, 3 Drawing Sheets

(56) References Cited

U.S. PATENT DOCUMENTS

| | | |
|---|---|---|
| 6,397,343 B1 | 5/2002 | Williams et al. |
| 6,473,086 B1 | 10/2002 | Morein et al. |
| 6,476,816 B1 | 11/2002 | Deming et al. |
| 6,496,187 B1 * | 12/2002 | Deering et al. ............... 345/419 |
| 6,535,216 B1 | 3/2003 | Deming et al. |
| 6,630,936 B1 | 10/2003 | Langendorf |
| 6,631,474 B1 | 10/2003 | Cai et al. |
| 6,654,826 B1 | 11/2003 | Cho et al. |
| 6,670,958 B1 | 12/2003 | Aleksic et al. |
| 6,700,586 B1 | 3/2004 | Demers |
| 6,704,021 B1 | 3/2004 | Rogers et al. |
| 6,708,217 B1 | 3/2004 | Colson et al. |
| 6,711,691 B1 | 3/2004 | Howard et al. |
| 6,714,200 B1 | 3/2004 | Talnykin et al. |
| 6,772,265 B2 | 8/2004 | Baweja et al. |
| 6,798,420 B1 | 9/2004 | Xie |
| 6,832,269 B2 | 12/2004 | Huang et al. |
| 6,835,070 B1 | 12/2004 | Law |
| 6,864,891 B2 | 3/2005 | Myers |
| 6,914,779 B2 | 7/2005 | Askeland et al. |
| 6,919,894 B2 | 7/2005 | Emmot et al. |
| 6,937,245 B1 | 8/2005 | Van Hook et al. |
| 6,956,579 B1 | 10/2005 | Diard et al. |
| 6,985,152 B2 | 1/2006 | Rubinstein et al. |
| 7,019,752 B1 | 3/2006 | Paquette et al. |
| 7,024,510 B2 | 4/2006 | Olarig |
| 7,058,829 B2 | 6/2006 | Hamilton |
| 7,079,149 B2 | 7/2006 | Main et al. |
| 7,080,181 B2 | 7/2006 | Wolford |
| 7,119,808 B2 | 10/2006 | Gonzalez et al. |
| 7,203,909 B1 * | 4/2007 | Horvitz et al. ............... 715/765 |
| 7,260,839 B2 * | 8/2007 | Karasaki ........................ 726/11 |
| 7,321,367 B2 | 1/2008 | Isakovic et al. |
| 7,634,668 B2 | 12/2009 | White et al. |
| 7,663,633 B1 | 2/2010 | Diamond et al. |
| 2002/0073247 A1 | 6/2002 | Baweja et al. |
| 2002/0107809 A1 * | 8/2002 | Biddle et al. .................... 705/59 |
| 2002/0130889 A1 * | 9/2002 | Blythe et al. ................. 345/629 |
| 2002/0141152 A1 | 10/2002 | Pokharna et al. |
| 2002/0180725 A1 | 12/2002 | Simmonds et al. |
| 2003/0067470 A1 | 4/2003 | Main et al. |
| 2003/0193503 A1 * | 10/2003 | Seminatore et al. .......... 345/473 |
| 2003/0233391 A1 | 12/2003 | Crawford, Jr. et al. |
| 2004/0008200 A1 | 1/2004 | Naegle et al. |
| 2004/0021678 A1 | 2/2004 | Ullah et al. |
| 2004/0032861 A1 | 2/2004 | Lee |
| 2004/0039954 A1 | 2/2004 | White et al. |
| 2004/0103191 A1 * | 5/2004 | Larsson ....................... 709/224 |
| 2004/0125111 A1 | 7/2004 | Tang-Petersen et al. |
| 2004/0189677 A1 | 9/2004 | Amann et al. |
| 2005/0028015 A1 | 2/2005 | Asano et al. |
| 2005/0088445 A1 | 4/2005 | Gonzalez et al. |
| 2005/0144452 A1 | 6/2005 | Lynch et al. |
| 2005/0190190 A1 | 9/2005 | Diard et al. |
| 2005/0190536 A1 | 9/2005 | Anderson et al. |
| 2005/0270298 A1 | 12/2005 | Thieret |
| 2006/0107250 A1 | 5/2006 | Tarditi, Jr. et al. |
| 2006/0161753 A1 | 7/2006 | Aschoff et al. |
| 2006/0168230 A1 | 7/2006 | Caccavale et al. |
| 2006/0176881 A1 * | 8/2006 | Ma et al. ....................... 370/392 |
| 2008/0084419 A1 | 4/2008 | Bakalash et al. |

FOREIGN PATENT DOCUMENTS

| | | |
|---|---|---|
| TW | 485309 | 5/2002 |
| TW | 591400 | 6/2004 |
| TW | 200422936 | 11/2004 |
| TW | I223752 | 11/2004 |
| TW | 200501046 | 1/2005 |
| WO | 2005010854 | 2/2005 |

OTHER PUBLICATIONS http://www.informit.com/articles/article.aspx?p=339936.*

Luke E J et al Institute of Electrical and Electronics Engineers: "Semotus Visum: a flexible remote visualitzation framework" VIS 2002. IEEE Visualization 2002. Proceedings. Boston, MA, Oct. 27-Nov. 1, 2002, Annual IEEE conference on visualization, New York, NY: IEEE, US, Oct. 27, 2002, pp. 61-68, XP010633279 ISBN: 0-7803-7498-3.*

Luke E J et al Institute of Electrical and Electronics Engineers: "Semotus Visum: a flexible remote visualization framework" VIS 2002. IEEE Visualization 2002. Proceedings. Boston, MA, Oct. 27-Nov. 1, 2002, Annual IEEE conference on visualization, New York, NY; IEEE, Oct. 27, 2002, pp. 61-68 XP010633279 ISBN: 0-7803-7498-3.*

Luke, E. J. et al., "Semotus Visum: a flexible remote visualization framework", IEEE Visualization 2002, Oct. 27-Nov. 1, 2002, Boston, MA, pp. 61-68.

Casera, S. et al., "A Collaborative Extension of a Visualization System", Proceedings of the First International Conference on Distributed Frameworks for Multimedia Applications (DFMA'05), Feb. 6-9, 2005, Besoncon, France, pp. 176-182.

Stegmaier, S. et al., "Widening the Remote Visualization Bottleneck", Proceedings of the 3rd International Symposium on Image and Signal Processing and Analysis 2003, Sep. 18-20, 2003, Rome, Italy, vol. 1 No. 18, pp. 174-179.

Miller, J. R., "The Remote Application Controller", Computer and Graphics, Pergamon Press Ltd, Oxford, Great Britain, vol. 27 No. 4, Aug. 2003, pp. 605-615.

Bhatt, Ajay V., "Creating a PCI Interconnect", 2002.

U.S. Appl. No. 60/523,084 of Bakalash et al. (2008/0084419), Nov. 19, 2003.

Rupley, Sebastian, "Intel Developer Forum to Spotlight PCI Express," PC Magazine dated Sep. 2002.

http://www.informit.com/article.aspx?p=339936, Oct. 22, 2004.

* cited by examiner

USING A GRAPHICS SYSTEM TO ENABLE A MULTI-USER COMPUTER SYSTEM

BACKGROUND OF THE INVENTION

1. Field of the Invention

Embodiments of the present invention generally relate to computer system architectures. More particularly, embodiments of the present invention relate to using a graphics system to enable a multi-user computer system.

2. Related Art

Technological advances have significantly improved the performance of the computer system. However, there is a limit to the improvement in performance solely from technological advances. In the past, the computer system was mostly a productivity tool. Now, the computer system is evolving into both a digital entertainment tool and a productivity tool.

The traditional architecture of the computer system envisions a single user. If the computer system is configured with greater processing power (e.g., by increasing the number of processors), greater storage capacity (e.g., by increasing the size of the hard drive), and greater network communication capacity (e.g., by increasing network communication bandwidth), the typical single user underutilizes the resources of the computer system. Thus, the typical single user is not willing to pay the additional premium associated with scaling the traditional architecture.

SUMMARY OF THE INVENTION

A graphics system and a multi-user computer system are disclosed. The graphics system comprises a graphics processing unit (GPU) for processing pixels. It further includes a multi-user manager for allocating pixel processing capability for each one of a plurality of users, wherein each user uses a display and an input device. Moreover, the graphics system has a plurality of user attributes for each user.

The multi-user computer system comprises a central processing unit (CPU) and a disk drive configured to support a plurality of users. Further, the multi-user computer system includes the graphics system.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
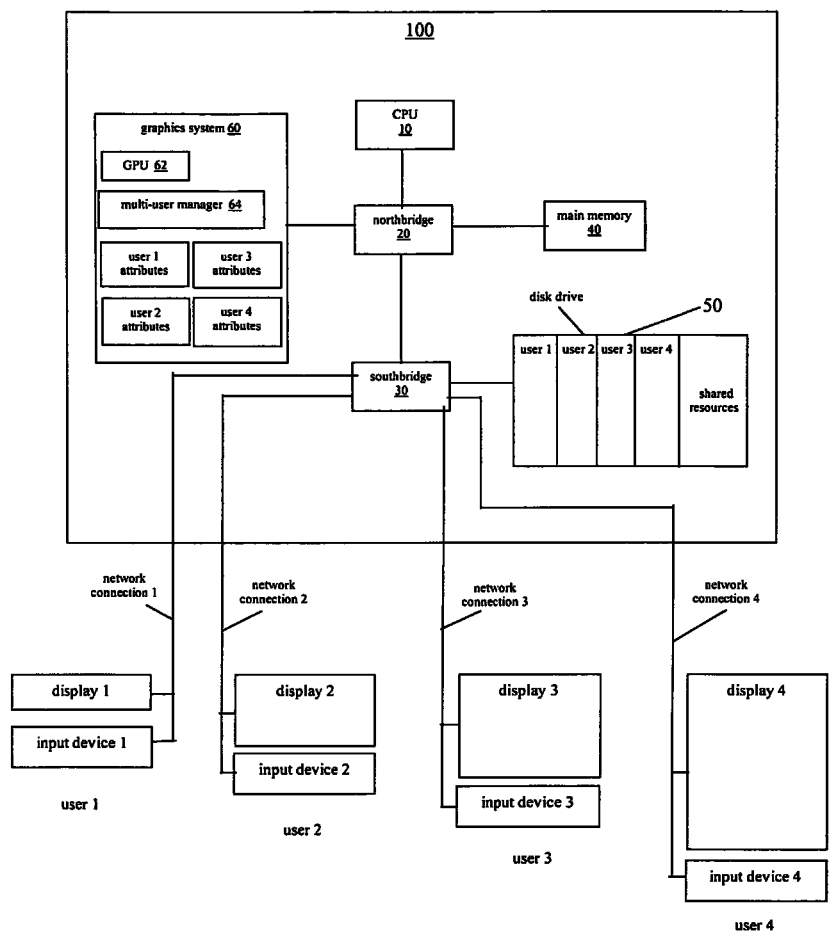
FIG. 1 illustrates a multi-user computer system in accordance with an embodiment of the present invention.

FIG. 1 illustrates a multi-user computer system 100 in accordance with an embodiment of the present invention. The traditional computer system is transformed from an underutilized single user computer system into an extensively utilized multi-user computer system 100. It should be understood that the multi-user computer system 100 may have other configurations.

As depicted in FIG. 1, the multi-user computer system 100 concurrently supports four different users (e.g., user 1, user 2, user 3, and user 4). It should be understood that the multi-user computer system 100 may be configured to support other number of users. Each user operates a respective display (e.g., display 1, display 2, display 3, and display 4) and a respective input device (e.g., input device 1, input device 2, input device 3, and input device 4). The displays (e.g., display 1, display 2, display 3, and display 4) may have different display sizes. The display and input device may be integrated or separate. Examples of integrated display and input device include a PDA (personal digital assistant) and a cell phone.

Each user is connected via a wired or wireless network connection (e.g., network connection 1, network connection 2, network connection 3, and network connection 4) to the multi-user computer system 100. In practice, the users share the resources of the multi-user computer system 100. Moreover, the multi-user computer system 100 provides computational processing, storage, network communication, and graphical/pixel processing services to the users. For example, graphics-intensive processing applications may be executed at the multi-user computer system 100 and then displayed and interacted with on the PDA and the cell phone.

As shown in FIG. 1, the multi-user computer system 100 includes a central processing unit 10, a northbridge unit 20, a southbridge unit 30, a main memory 40, and a disk drive 50. Further, the multi-user computer system 100 has a graphics system 60.

The graphics system 60 includes a graphics processing unit (GPU) 62, a multi-user manager 64, and user attributes (e.g., user 1 attributes, user 2 attributes, user 3 attributes, and user 4 attributes) for each user. The user attributes include the display size of the display used by each user. The GPU 62 is a semiconductor device that specializes in rapidly processing graphical or pixel data compared to a typical central processing unit (CPU) 10. The GPU 62 may also be utilized for general purpose processing tasks typically performed by the CPU 10. The graphics system 60 may also have multiple GPUs 62. Further, additional GPUs 62 may be added to the graphics system 60 in any one of numerous ways. For example, a module (e.g., graphics card) having a single GPU or multiple GPUs may be coupled to the graphics system 60. Moreover, multiple modules (e.g., graphics cards) having a single GPU or multiple GPUs may be coupled to the graphics system 60. Further, the GPU 62 may have one or multiple cores for graphical data processing.

Figure 2:
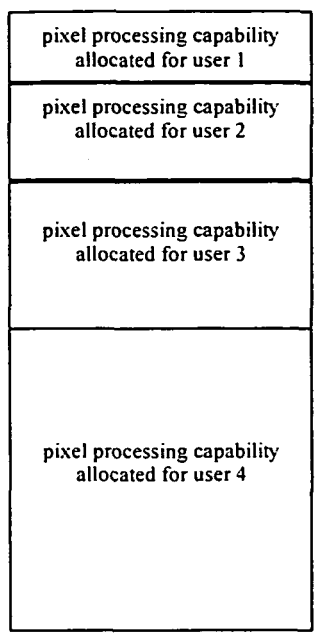
FIG. 2 illustrates allocation of pixel processing capability of a graphics system for each user in accordance with an embodiment of the present invention.

The multi-user manager 64 receives requests for the multi-user computer system 100 to support additional users. The multi-user manager 64 decides whether to accept the request. If the multi-user manager 64 accepts the request, the multi-user manager allocates pixel processing capability for the additional user and creates user attributes for the additional user. FIG. 2 illustrates allocation of pixel processing capability of the graphics system 60 for each user (e.g., user 1, user 2, user 3, and user 4) in accordance with an embodiment of the present invention. As shown in FIG. 2, allocation of pixel processing capability is dependent on the needs of the user. As the display size of the user increases, a larger allocation of pixel processing capability is required for the user.

Referring again to FIG. 1, the disk drive 50 is partitioned into sections for each user (e.g., user 1, user 2, user 3, and user 4). Further, the disk drive 50 includes a section for shared resources available to all users. If an additional user is accepted, the multi-user computer system 100 is configured to support the additional user. This configuration includes creating a section for the additional user in the disk drive 50.

Figure 3:
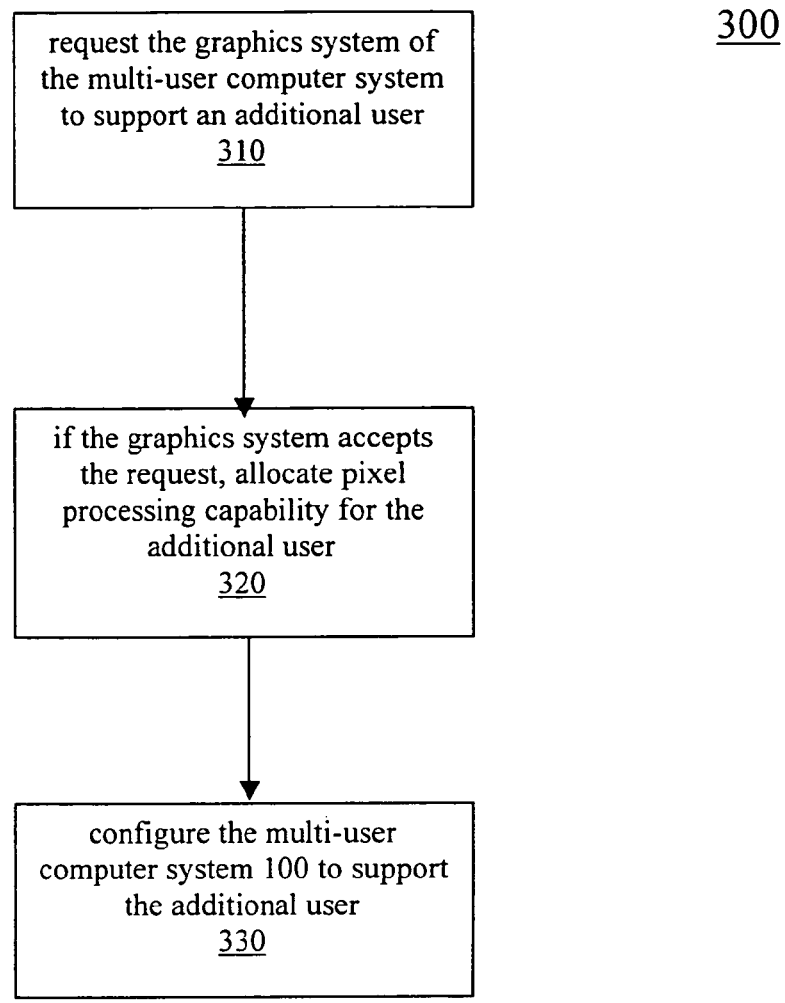
FIG. 3 illustrates a flow chart showing a method of supporting an additional user in a multi-user computer system in accordance with an embodiment of the present invention.

FIG. 3 illustrates a flow chart showing a method 300 of supporting an additional user in a multi-user computer system 100 in accordance with an embodiment of the present invention. Reference is made to FIGS. 1 and 2, At Block 310, the graphics system 60 of the multi-user computer system 100 is requested to support an additional user. In particular, the multi-user manager 64 receives the request to support the additional user. Moreover, the multi-user manager 64 decides whether to accept the request.

Continuing, at Block 320, pixel processing capability is allocated for the additional user if the graphics system 60 accepts the request. Allocation of pixel processing capability is depicted in FIG. 2.

In an embodiment, the request may include proof of an additional license for the additional user to use the graphics system. In another embodiment, the request may include an authorization key obtained after payment of a fee. In yet another embodiment, the request may include payment for supporting the additional user.

Further, at Block 330, the multi-user computer system 100 is configured to support the additional user. This configuration includes creating a section for the additional user in the disk drive 50 of the multi-user computer system 100.

In sum, a seamless experience for multiple users is created at a reduced cost and without a cumbersome process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
   A plurality of systems including a graphics system, wherein said graphics system is configured to grant or to deny access by a user to said plurality of systems,
   Wherein said graphics system includes:
      a communication link;
      a graphics processing unit (GPU) for processing pixels, wherein said GPU is located in said graphics system;
      a pixel processing capability property of said graphics system allocated by a multi-user manager instead of an accepted user into a plurality of pixel processing capability allocations;
      said multi-user manager operable to decide whether to accept a user to access services available and operable to allocate an appropriate portion of said pixel processing capability property to each accepted user upon said user being accepted, wherein each allocation of said pixel processing capability property is exclusive to a respective accepted user, wherein said services available include computational processing, storage, network communication, and pixel processing, wherein said multi-user manager is located in said graphics system; and
      a plurality of user attributes for each accepted user, wherein said multi-user manager creates said user attributes for each accepted user, wherein said multi-user manager creates said user attributes upon said user being accepted, and wherein said user attributes are located in said graphics system, wherein each accepted user operates a respective display and a respective input device, and wherein said user attributes include display size of each accepted user.

2. The apparatus as recited in claim 1, wherein said multi-user manager receives a request to support an additional user.

3. The apparatus as recited in claim 2 wherein if said multi-user manager accepts said request, said multi-user manager allocates an appropriate portion of said pixel processing capability property to said additional accepted user.

4. The apparatus as recited in claim 2 wherein said request includes proof of an additional license.

5. The apparatus as recited in claim 3 wherein said request includes an authorization key.

6. The apparatus as recited in claim 2 wherein said request includes payment for supporting said additional user.

7. A multi-user computer system comprising:
   a processing system, wherein said processing system includes a central processing unit (CPU);
   a storage system, wherein said storage system includes a disk drive partitioned into a shared portion for resources available to accepted users and at least one section, wherein each section is exclusive to an accepted user;
   a graphics system, wherein said graphics system is configured to grant or to deny access by a user to said processing, storage, and graphics systems; wherein said graphics system comprises:
      a graphics processing unit (GPU) for processing pixels, wherein said GPU is located in said graphics system;
      a pixel processing capability property of said graphics system allocated by a multi-user manager instead of said accepted user into a plurality of pixel processing capability allocations;
      said multi-user manager operable to decide whether to accept a user to access services available from said multi-user computer system and operable to allocate an appropriate portion of said pixel processing capability property to each accepted user upon said user being accepted, wherein each allocation of said pixel processing capability property is exclusive to a respective accepted user, wherein said services available include computational processing, storage, network communication, and pixel processing, wherein said multi-user manager is located in said graphics system; and
      a Plurality of user attributes for each accepted user, wherein said multi-user manger creates said user attributes upon said user being accepted, and wherein said user attributes are located in said graphics system, wherein each accepted user operates a respective display and a respective input device, and wherein said user attributes include display size of each accepted user.

8. The multi-user computer system as recited in claim 7, wherein said multi-user manager receives a request to support an additional user in said multi-user computer system.

9. The multi-user computer system as recited in claim 8 wherein if said multi-user manager accepts said request, said multi-user manager allocates an appropriate portion of said pixel processing capability property to said additional accepted user.

10. The multi-user computer system as recited in claim 8 wherein said request includes proof of an additional license.

11. The multi-user computer system as recited in claim 9 wherein said request includes an authorization key.

12. The multi-user computer system as recited in claim 8 wherein said request includes payment for supporting said additional user.

13. A method of supporting an additional user in a multi-user computer system, said method comprising:
   providing a plurality of systems including a graphics system, a processing system, and a storage system; and
   using said graphics system to grant or to deny access by the additional user to said plurality of systems;
   Wherein said using said graphics system includes:
      requesting said graphics system of said multi-user computer system to support said additional user in said multi-user computer system, wherein said graphics system comprises a pixel processing capability property of said graphics system allocated by a multi-user manager instead of an accepted user into a plurality of pixel processing capability allocations, wherein said graphics system includes said multi user manager for receiving said request to support said additional user in said multi-user computer system, wherein said multi-user manager is located in said graphics system;
      upon said graphics system accepting said request, allocating an appropriate portion of said pixel processing capability property exclusively to said additional accepted user and creating user attributes for said additional accepted user to access services available from said multi-user computer system, wherein said services available include computational processing, storage, network communication, and pixel processing, wherein each accepted user operates a respective display and a respective input device.

14. The method as recited in claim 13 wherein said user attributes include a display size of said additional accepted user.

15. The method as recited in claim 14 wherein said multi-user manager decides whether to accept said additional user.

16. The method as recited in claim 13 wherein said request includes proof of an additional license.

17. The method as recited in claim 13 wherein said request includes an authorization key.

18. The method as recited in claim 13 wherein said request includes payment for supporting said additional user.

\* \* \* \* \*